(12) United States Patent
Marinescu et al.

(10) Patent No.: US 11,144,227 B2
(45) Date of Patent: Oct. 12, 2021

(54) CONTENT-BASED POST-PROCESS DATA DEDUPLICATION

(71) Applicant: VMware, Inc., Palo Alto, CA (US)

(72) Inventors: Adrian Marinescu, Issaquah, WA (US); Glen McCready, Redwood City, CA (US)

(73) Assignee: VMWARE, INC., Palo Alto, CA (US)

( * ) Notice: Subject to any disclaimer, the term of this patent is extended or adjusted under 35 U.S.C. 154(b) by 902 days.

(21) Appl. No.: 15/698,636

(22) Filed: Sep. 7, 2017

(65) Prior Publication Data
US 2019/0073151 A1 Mar. 7, 2019

(51) Int. Cl.
*G06F 3/06* (2006.01)
*G06F 16/174* (2019.01)
*G06F 11/14* (2006.01)

(52) U.S. Cl.
CPC .......... *G06F 3/0641* (2013.01); *G06F 3/0608* (2013.01); *G06F 3/0673* (2013.01); *G06F 16/1748* (2019.01); *G06F 11/1453* (2013.01)

(58) Field of Classification Search
CPC .. G06F 16/1748; G06F 3/0641; G06F 3/0608; G06F 3/0673; G06F 11/1453
USPC .......................................................... 707/692
See application file for complete search history.

(56) References Cited

U.S. PATENT DOCUMENTS

| | | | |
|---|---|---|---|
| 9,268,784 B1 * | 2/2016 | Guo | G06F 3/0641 |
| 2013/0179408 A1 * | 7/2013 | Stoakes | G06F 16/1752 |
| | | | 707/692 |
| 2014/0195497 A1 * | 7/2014 | Amit | G06F 16/215 |
| | | | 707/693 |
| 2014/0244604 A1 | 8/2014 | Oltean et al. | |
| 2014/0365449 A1 * | 12/2014 | Chambliss | G06F 16/1752 |
| | | | 707/692 |
| 2015/0046127 A1 * | 2/2015 | Chen | G05B 23/0221 |
| | | | 702/189 |
| 2015/0213049 A1 * | 7/2015 | Kleiman | G06F 16/1752 |
| | | | 707/692 |

(Continued)

OTHER PUBLICATIONS

Dal Bianco, Guilherme, et al. "A practical and effective sampling selection strategy for large scale deduplication." IEEE Transactions on Knowledge and Data Engineering 27.9 (2015): 2305-2319. (Year: 2015).*

(Continued)

*Primary Examiner* — Mohsen Almani

(57) ABSTRACT

Techniques for implementing content-based post-process data deduplication are provided. In one set of embodiments, a computer system can receive a write request comprising write data to be persisted to a storage system and can sample a portion of the write data. The computer system can further execute one or more analyses on the sampled portion in order to determine whether the write data is a good deduplication candidate that is likely to contain redundancies which can be eliminated via data deduplication. If the one or more analyses indicate that the write data is a good deduplication candidate, the computer system can cause the write data to be persisted to a staging storage component of the storage system. Otherwise, the computer system can cause the write data to be persisted to a primary storage component of the storage system that is separate from the staging storage component.

15 Claims, 4 Drawing Sheets

(56) References Cited

U.S. PATENT DOCUMENTS

2016/0371292 A1* 12/2016 Narasimha .............. H03M 7/00
2017/0090776 A1* 3/2017 Kowles ................. G06F 3/0655

OTHER PUBLICATIONS

Wei, Jiansheng, Junhua Zhu, and Yong Li. "Multimodal content defined chunking for data deduplication." Huawei Technologies (2014). (Year: 2014).*

"Data deduplication", Wikipedia, https://en.wikipedia.org/wiki/Data_deduplication, downloaded Sep. 7, 2017, 6 pages.

Jaspreet Singh, "Understanding Data Duplication", Druva, Jan. 9, 2009, 17 pages.

* cited by examiner

CONTENT-BASED POST-PROCESS DATA DEDUPLICATION

BACKGROUND

Data deduplication is a technique for optimizing space usage in a storage system by eliminating redundant data. For example, if a storage system contains one hundred storage objects O1-O100 that each include an identical block of data B, data deduplication enables only one copy of B to be retained on the physical storage device(s) of the system. In this example, each storage object O1-O100 is configured to point to the single copy of B (rather than including a redundant copy of the data), thereby reducing the storage footprint of the objects.

Data deduplication is typically performed in either an inline or post-process manner. With the inline approach, data destined for storage is deduplicated as part of the I/O data path, prior to being written to disk. With the post-process approach, data is written to disk first and then processed at a later time (typically via a background thread/process) in order to identify and remove duplicate data blocks from storage. The inline approach is generally more efficient in terms of storage space and storage bandwidth utilization than the post-process approach, since data redundancies are eliminated before reaching the disk and no further I/O is required for deduplication purposes after the data is written. However, a significant disadvantage of the inline approach is that it increases the amount of CPU work that is needed per write request, resulting in higher write latency and lower data throughput. This can degrade the I/O performance of certain client workloads and can potentially bottleneck the I/O performance of highly-parallel, low-latency storage devices.

Post-process data deduplication avoids the per-I/O performance penalty of inline deduplication by moving deduplication processing out of the I/O data path. However, the post-process approach requires more storage space in order to temporarily hold duplicate copies of data until they are detected and eliminated via post-processing. In addition, post-process data deduplication necessarily results in I/O amplification—in other words, the execution of additional I/O against storage beyond the I/O initiated by storage clients. This additional I/O (which arises from the need to read the data previously written, calculate fingerprint(s) based on the data, and update logical-to-physical block mappings if appropriate) can adversely affect the performance of client workloads that are being concurrently run against the storage system.

DETAILED DESCRIPTION

Figure 1:
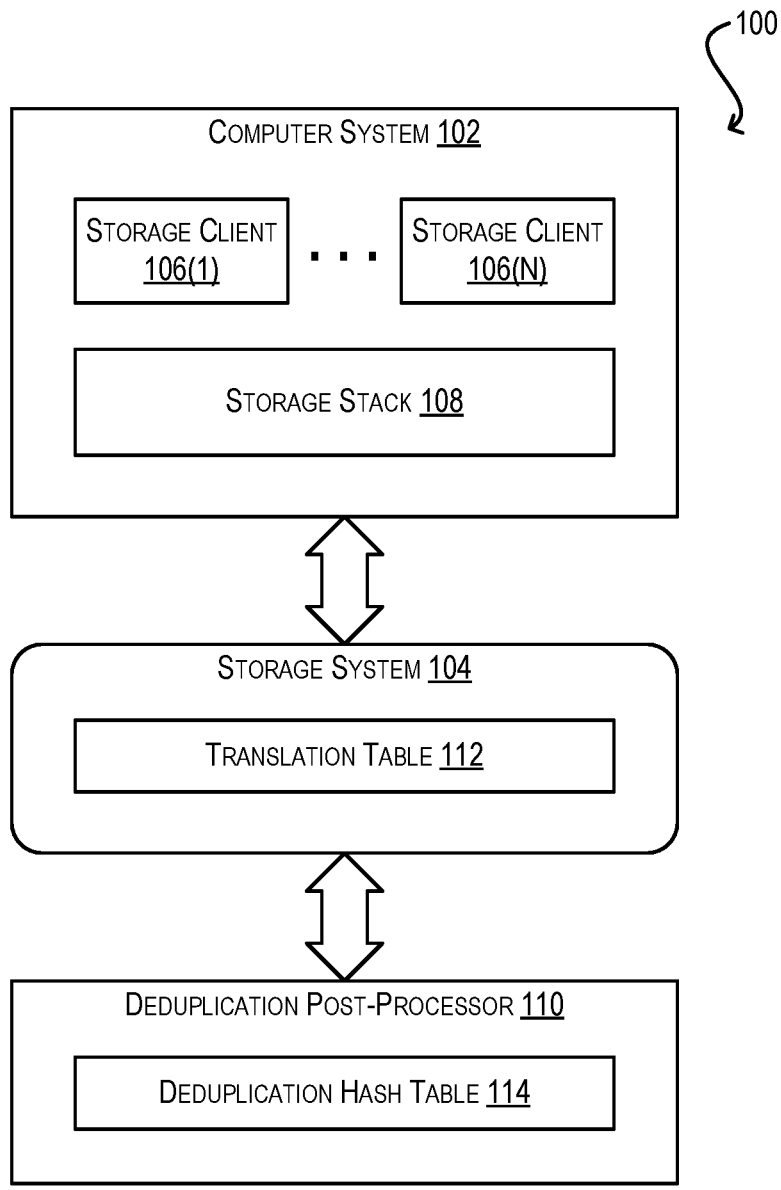
FIG. 1 depicts an example system environment implementing conventional post-process data deduplication.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure provides techniques for performing post-process data deduplication in a manner takes into account the content of the data being written to storage. In one set of embodiments, a content analyzer implemented within the I/O data path of a computer system can intercept a write request destined for a storage system, sample a portion of the write data associated with the request, and analyze the sample to determine whether the write data is a "good" deduplication candidate (i.e., is likely to contain redundant data blocks that can be eliminated via data deduplication). The specific types of analyses that are performed by the content analyzer for making this determination can be configurable and can depend on various factors such as the types of workloads being performed, the nature of the storage clients, and so on. For instance, in one embodiment, the content analyzer can perform a signature-based analysis that looks at whether the sample includes one or more data signatures that are part of storage objects that are likely to contain redundant data (e.g., executable files, known content images, etc.). In another embodiment, the content analyzer can perform a proximity-based analysis that evaluates whether the data block(s) of the sample are "close" (in terms of storage address) to other data blocks that were previously deemed to be good deduplication candidates.

If the content analyzer determines that the write data is a good deduplication candidate based on its analysis, the content analyzer can cause the write data to be persisted to a staging storage component of the storage system. A deduplication post-processor can access this staging storage component on a periodic basis, deduplicate the data stored therein, and propagate the data to a primary storage component of the storage system. On the other hand, if the content analyzer determines that the write data is not a good deduplication candidate based on its analysis, the content analyzer can cause the write data to be persisted directly to the primary storage component (which is not accessed/processed by the deduplication post-processor).

With this general approach, a number of benefits can be realized over conventional post-process data deduplication. First, since the deduplication post-processor of the present disclosure only processes data that is likely to contain redundant blocks (i.e., the good deduplication candidates written to the staging storage component) and does not process data that is unlikely to contain redundant blocks (i.e., the bad deduplication candidates written to the primary storage component), the I/O amplification and other overhead caused by such post-processing can be reduced without substantially affecting the degree of storage space optimization achieved. At the same time, because the analysis performed by the content analyzer to identify good/bad deduplication candidates is less costly that calculating data fingerprints, this approach still maintains a performance advantage (in terms of I/O latency and throughput) over inline data deduplication. In embodiments where the content analyzer uses a signature-based analysis, a feedback loop can be implemented that automatically refines/augments the content analyzer's database of data signatures based on past decisions it has made, thereby tuning its operation to minimize the incidence of false negatives and false positives.

Second, by using a separate staging storage component to hold good deduplication candidates for post-processing purposes, the approach described above avoids the need for extra storage space on the primary storage component to hold redundant data prior to being deduplicated and also reduces the interaction of background I/O initiated by the deduplication post-processor with client workloads that may be running concurrently against the primary storage component. In some embodiments, the staging storage component can be implemented using one or more high speed, low-latency storage devices (e.g., NVMe-based flash or NVDIMM) to accelerate post-processing operations.

These and other aspects of the present disclosure are described in further detail in the sections that follow.

2. System Environment and High-Level Workflow

FIG. 1 is a simplified block diagram of a system environment 100 in which embodiments of the present disclosure may be implemented. As shown, system environment 100 includes a computer system 102 that is communicatively coupled with a storage system 104. Computer system 102 comprises a number of storage clients (e.g., operating systems, hypervisors, applications, virtual machines (VMs), etc.) 106(1)-(N) and a storage stack 108. Storage stack 108 provides an I/O data path that enables storage clients 106 (1)-(N) to read data from, and write data to, logical storage objects (e.g., files) that are persisted on the physical storage device(s) of storage system 104.

Although not depicted, storage stack 108 typically includes a file system layer that translates client I/O requests directed to files into I/O commands that specify logical block addresses (LBAs). These I/O commands are communicated via a block-level interface (e.g., SCSI, ATA, etc.) to a controller of storage system 104, which translates the LBAs into physical block addresses (PBAs) corresponding to the physical locations where the requested data is stored and executes the I/O commands against the physical block addresses.

In the example of FIG. 1, system environment 100 implements post-process deduplication of data that is written by storage clients 106(1)-(N). To that end, system environment 100 includes a deduplication post-processor 110 that is communicatively coupled with storage system 104 and that interacts with a translation table 112 (maintained on storage system 104) and a deduplication hash table 114 (maintained on post-processor 110). Translation table 112 can hold, for each data block written by storage clients 106(1)-(N), a mapping between (1) the LBA for the data block and (2) a PBA in a particular physical storage device of storage system 104 where the data block is actually stored. Deduplication hash table 114 can hold, for each physical data block stored in storage system 104, an entry that identifies (1) the PBA of the data block, (2) a fingerprint (e.g., hash) of the content of the data block, and (3) and a reference count of the number of LBAs that point to this PBA in translation table 112.

On a periodic basis, deduplication post-processor 110 can scan the data blocks that have been written to storage system 104 since its last invocation and can remove (i.e., deduplicate) redundant blocks. This processing can comprise, for each such data block B, calculating a fingerprint F of the content of B and checking whether F exists in deduplication hash table 114. If so, deduplication post-processor 110 can conclude that an exact copy of B (i.e., B') already exists on disk and thus can eliminate B by (1) modifying the LBA-to-PBA mapping for B in translation table 112 to point to the physical address of existing copy B', (2) increment reference count for the entry of B' in deduplication hash table 114, and (3) mark the PBA for B as free/empty. On the other hand, if F cannot be found in deduplication hash table 114, deduplication post-processor 110 can conclude that B is unique (i.e., is the only copy of this data content stored on disk). As a result, deduplication post-processor 110 can simply add a new entry for B (with its PBA, fingerprint, and a reference count of 1) to deduplication hash table 114 and move on to the next data block.

As mentioned in the Background section, since post-process deduplication is performed asynchronously with respect to the I/O data path used by storage clients, it avoids the per-I/O performance penalty that is incurred by inline deduplication and thus is preferable for workloads/deployments where storage performance is critical (and/or deployments that make use of very high-speed storage devices). However, conventional implementations of post-process deduplication can still adversely affect storage performance due to I/O amplification and undesirably increase storage space usage for at least a temporary period of time.

Figure 2:
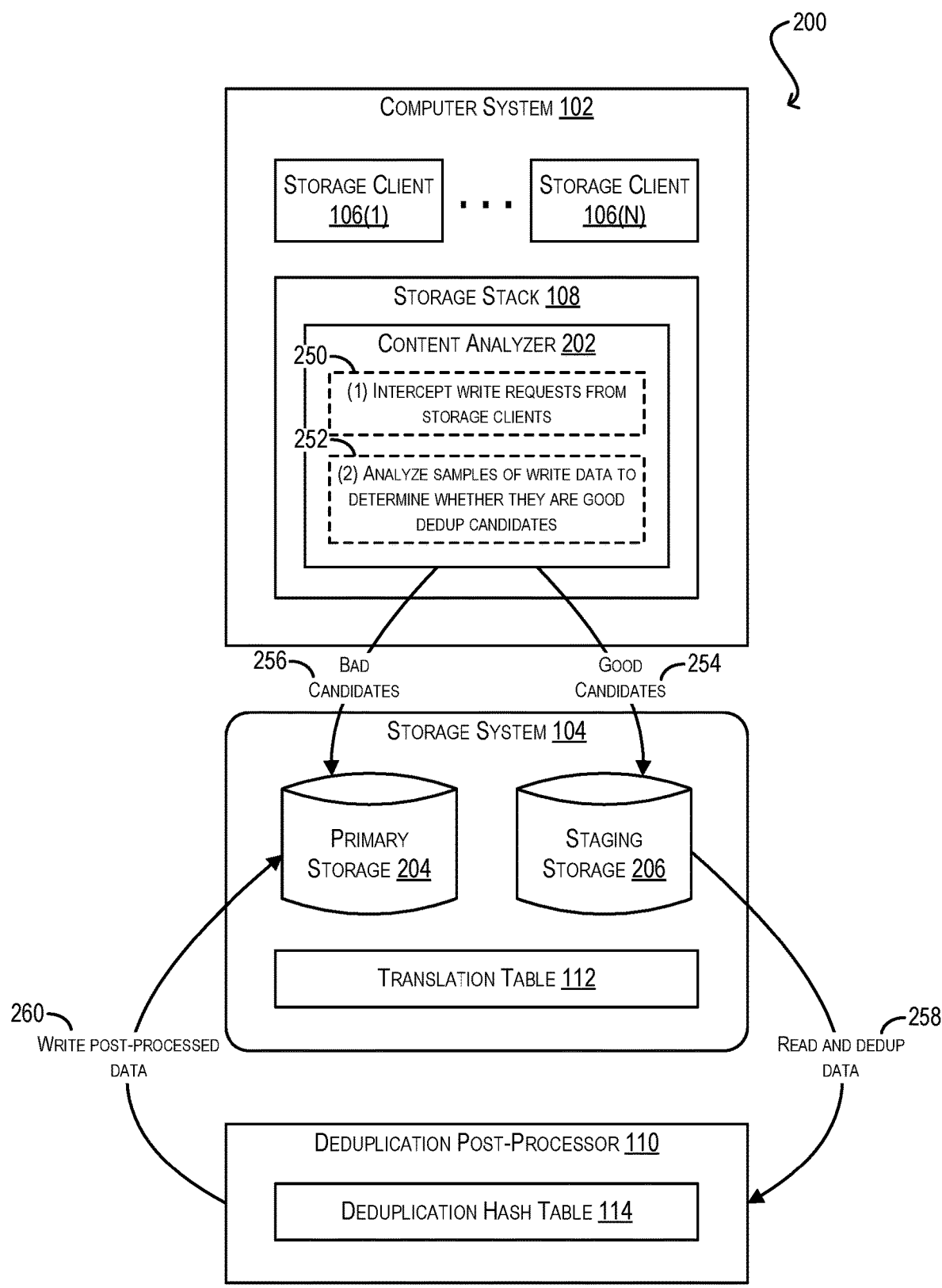
FIG. 2 depicts an enhanced version of the system environment of FIG. 1 that implements content-based post-process data deduplication according to an embodiment.

To address these and other similar issues, FIG. 2 depicts an enhanced version of system environment 100 (200) that includes a novel content analyzer 202 within storage stack 108 of computer system 102 and two separate storage components—a primary storage component 204 and a staging storage component 206—within storage system 104. As shown in FIG. 2, content analyzer 202 can, as part of the I/O data path used by storage clients 106(1)-(N), intercept write requests issued by these clients (reference numeral 250) and analyze portions (i.e., samples) of the write data associated with the requests in order to determine whether these pieces of data are "good" or "bad" deduplication candidates (reference numeral 252). As used herein, a good deduplication candidate is likely to contain redundant data blocks that can be eliminated via deduplication, whereas a bad deduplication candidate is unlikely to contain any such redundant data blocks. The analysis or set of analyses that content analyzer 202 performs at reference numeral 252 can take various forms and can depend on various factors (e.g., nature of storage clients 106(1)-(N), types of workloads they are executing, etc.) which can be configured via one or more user-defined policies. Generally speaking, these analyses will be less costly from a CPU perspective than the per-I/O operations (e.g., hash calculation, etc.) that are required for inline deduplication.

For the write requests that are deemed to correspond to good deduplication candidates, content analyzer 202 can cause the write data associated with those requests to be written to staging storage component 206 of storage system 104 (reference numeral 254). Conversely, for the write requests that are deemed to correspond to bad deduplication candidates, content analyzer 202 can cause the write data associated with hose requests to be written to primary storage component 204 of storage system 104 (reference numeral 256). Deduplication post-processor 110 can then perform its post-processing activities against staging storage component 206 in order to deduplicate the data in component 206 and propagate that processed data to primary storage component 204 (reference numerals 258 and 260). Note that deduplication post-processor 110 does not perform any deduplication post-processing with respect to the data written directly to primary storage component 204.

With the architecture and high-level workflow shown in FIG. 2, the efficiency of deduplication post-processor 110 is significantly improved since it does not need to perform I/O or consume resources in order to post-process data that is unlikely to yield any storage space optimization via deduplication (i.e., the bad deduplication candidates in primary storage). Rather, deduplication post-processor 110 can focus its efforts on data that is likely to generate storage space savings (i.e., the good deduplication candidates in staging storage). This advantageously results in less I/O amplification and fewer interactions between the I/O performed during post-processing and the I/O generated by storage clients 106(1)-(N). To increase the accuracy of content analyzer 202 in making good/bad deduplication candidate determinations, in certain embodiments a feedback loop can be implemented that is configured to dynamically tune content analyzer 202's operation and thereby reduce the incidence of false positives and false negatives (described in Section 4 below).

In addition, the use of staging storage component 206 as a separate storage area for temporarily holding write data awaiting post-processing advantageously reduces space usage on primary storage component 204 and further reduces the interactions between post-processing I/O and client-initiated I/O. As mentioned previously, in some embodiments staging storage component 206 may be implemented using very fast storage media such as NVMe flash storage or even nonvolatile DIMMs (NVDIMMs). This ensures that deduplication post-processor 110 can execute its post-processing operations as quickly as possible.

It should be appreciated that FIGS. 1 and 2 are illustrative and not intended to limit embodiments of the present disclosure. For example, although deduplication post-processor 110 is shown as a standalone component, in certain embodiments deduplication post-processor 110 may be integrated into storage system 104 or computer system 102. Further, although content analyzer 202 is shown as being part of computer system 102, in certain embodiments content analyzer 202 may be integrated into storage system 104. Yet further, the various entities shown in these figures may include sub-components or implement functions that are not specifically described. One of ordinary skill in the art will recognize many variations, modifications, and alternatives.

3. Content Analysis

Figure 3:
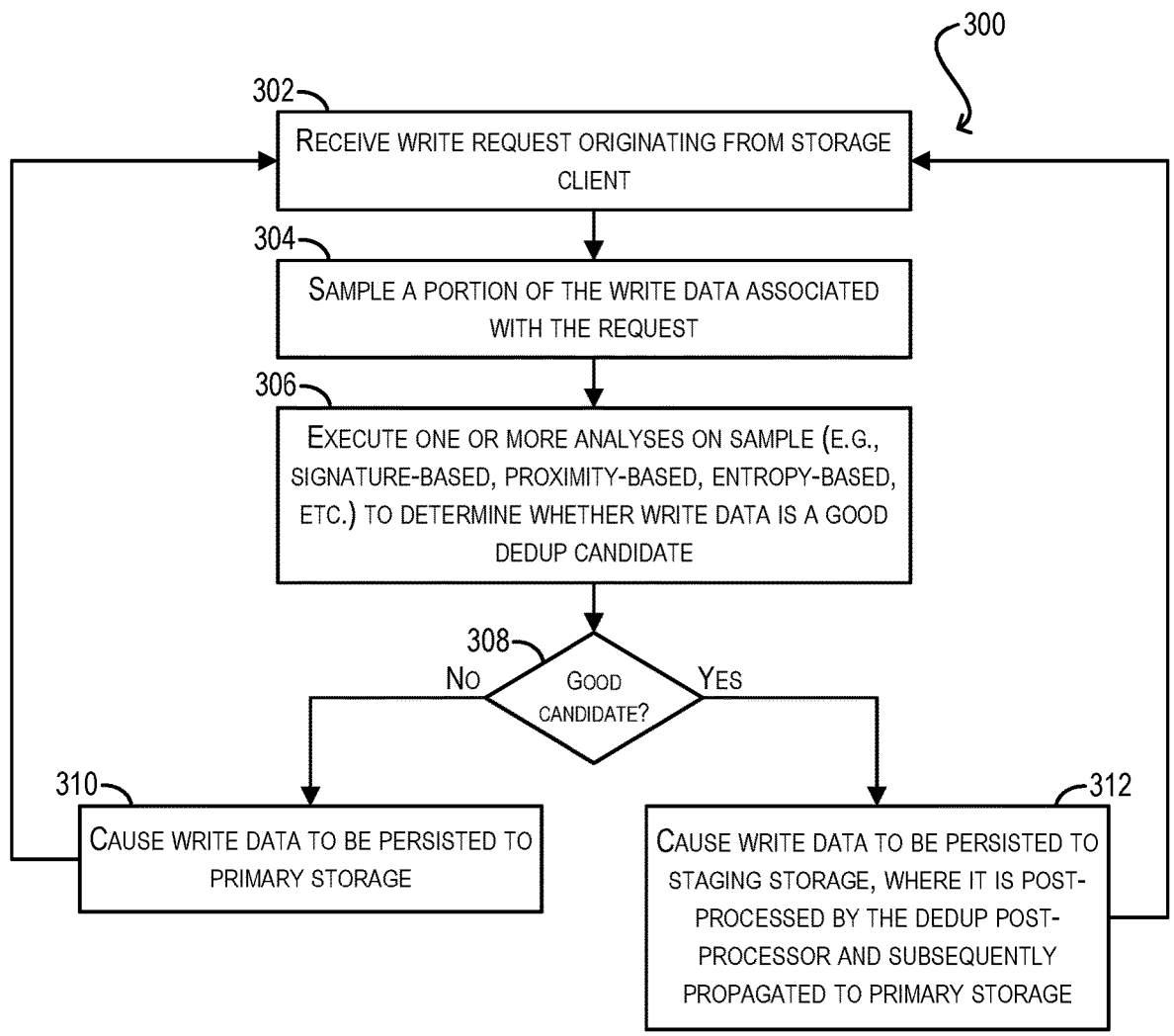
FIG. 3 depicts a flowchart performed by a content analyzer for processing write requests based on their data content and thereby identifying good and bad deduplication candidates according to an embodiment.

FIG. 3 depicts a flowchart 300 that provides additional details regarding the processing that may be performed by content analyzer 202 of FIG. 2 for identifying good and bad deduplication candidates according to an embodiment.

Starting with step 302, content analyzer 202 can receive a write request originating from a storage client 106 that includes data (i.e., "write data") to be written to one or more data blocks of storage system 104. In various embodiments, the one or more data blocks may be identified in the write request using logical block addresses (LBAs).

At step 304, content analyzer 202 can sample a portion of the write data. For example, if the write data is 128 kilobytes in size, content analyzer 202 may sample a 256 byte portion of the 128 kilobyte total. The specific manner in which this sampling is performed may be statically defined or may vary based on runtime criteria such as the nature of the write request.

Content analyzer 202 can then execute one or more analyses on the sample in order to determine whether the write data can be considered a good deduplication candidate (step 306). In one set of embodiments, these analyses can include a signature-based analysis that compares the sample against a database of data signatures maintained by content analyzer 202. Each signature in the database can comprise a sequence of one or more bytes at specified offset(s) within certain data block(s) and can correspond to data patterns that are typically found in files/storage objects that are good candidates for data deduplication (e.g., executable files, known content images, etc.). If a match is made between the sample and at least one signature in the database, the write data can be determined to be a good deduplication candidate.

In another set of embodiments, the analyses performed at step 306 can include a proximity-based analysis that looks at the "distance" between the data block(s) spanned by the sample and the data blocks of write requests that were previously evaluated by content analyzer 202. The distance metric can correspond to, e.g., how far apart the LBAs of the data blocks are. The main idea behind this proximity-based analysis is that, if one or more data blocks were previously determined to be part of a good deduplication candidate, data blocks in the vicinity of those data blocks are likely related to the same content and thus also likely to be part of a good deduplication candidate. Accordingly with this analysis, if the distance between the data blocks of the current write request are within some threshold distance of one or more previously processed data blocks, content analyzer 202 can reach the same conclusion (i.e., good or bad candidate) as that previous write request.

In yet another set of embodiments, the analyses performed at step 306 can include checking whether the current write request overlaps a previous write request—in other words, whether the current write request writes to one or more same data blocks as the previous request. If so, content analyzer 202 can infer that these data blocks are used for short-term (i.e., temporary) storage, and thus can conclude that the write data for the current request is not a good deduplication candidate.

In yet another set of embodiments, the analyses performed at step 306 can include an entropy-based analysis that involves calculating, using any one of a number of known entropy functions, an entropy level of the sample. This analysis is premised on the notion that data with high entropy (e.g., encrypted or compressed content) is unlikely have redundant data shared by other data blocks. Thus, if the calculated entropy level exceeds a threshold, content analyzer 202 can determine that the write data is not a good deduplication candidate.

In yet another set of embodiments, the analyses performed at step 306 can include checking whether the data blocks of the sample are part of a "lazy" initialized/allocated storage area (i.e., an area on disk that was previously reserved but not actually initialized/allocated until the current write request). If so, content analyzer 202 can infer that the write data is essentially "new" data that has not been written to storage before, and thus is a good candidate for deduplication.

Upon completing its analyses, if content analyzer 202 determines that the write data is not a good deduplication candidate, content analyzer 202 can cause the write data to be persisted directly to primary storage component 204 (steps 308 and 310). As a result, this write data will not be processed by post-processor 110 for deduplication purposes. Content analyzer 202 can then return to step 302 in order to evaluate the next write request received from storage clients 106.

However, if content analyzer 202 determines at block 308 that the write data is a good deduplication candidate, content analyzer 202 can cause the write data to be persisted to staging storage component 206 (block 312). As discussed with respect to FIG. 2, this write data can subsequently be processed by deduplication post-processor 110 in order to remove redundant data blocks and the processed data can be propagated to primary storage component 204.

It should be appreciated that flowchart 300 is illustrative and various modifications are possible. For example, although flowchart 300 indicates that the analyses performed at block 306 result in a single decision (i.e., good or bad candidate) with respect to the entirety of the write data associated with the received write request, in alternative embodiments content analyzer 202 may perform separate analyses, and generate a separate candidate decision, for each data block spanned by the write data (if it spans multiple blocks). While this approach is more compute intensive than the approach shown in FIG. 3, it can result in more granular and thus more accurate candidate determinations.

Further, the various types of analyses attributed to content analyzer 202 at step 306 may or may not be used based on various factors, and may be combined and/or ordered in different ways to arrive at a final candidate decision. One of ordinary skill in the art will recognize other variations, modifications, and alternatives.

4. Self-Tuning Feedback Loop

In embodiments where content analyzer 202 makes use of a signature-based analysis in order to identify good deduplication candidates, a feedback loop comprising a tuning engine may be implemented. This tuning engine (which may be incorporated into computer system 102 or implemented as a separate entity in system environment 200 of FIG. 2) can refine/augment the content analyzer's database of data signatures in a dynamic and continuous manner based on the candidate decisions that it has made. In this way, the tuning engine can improve the operation of content analyzer 202 and reduce the incidence of false positives (i.e., cases where write data is identified as being a good deduplication candidate even though it cannot be deduplicated) and false negatives (i.e., cases where write data is identified as not being a good deduplication candidate even though it can be deduplicated).

Figure 4:
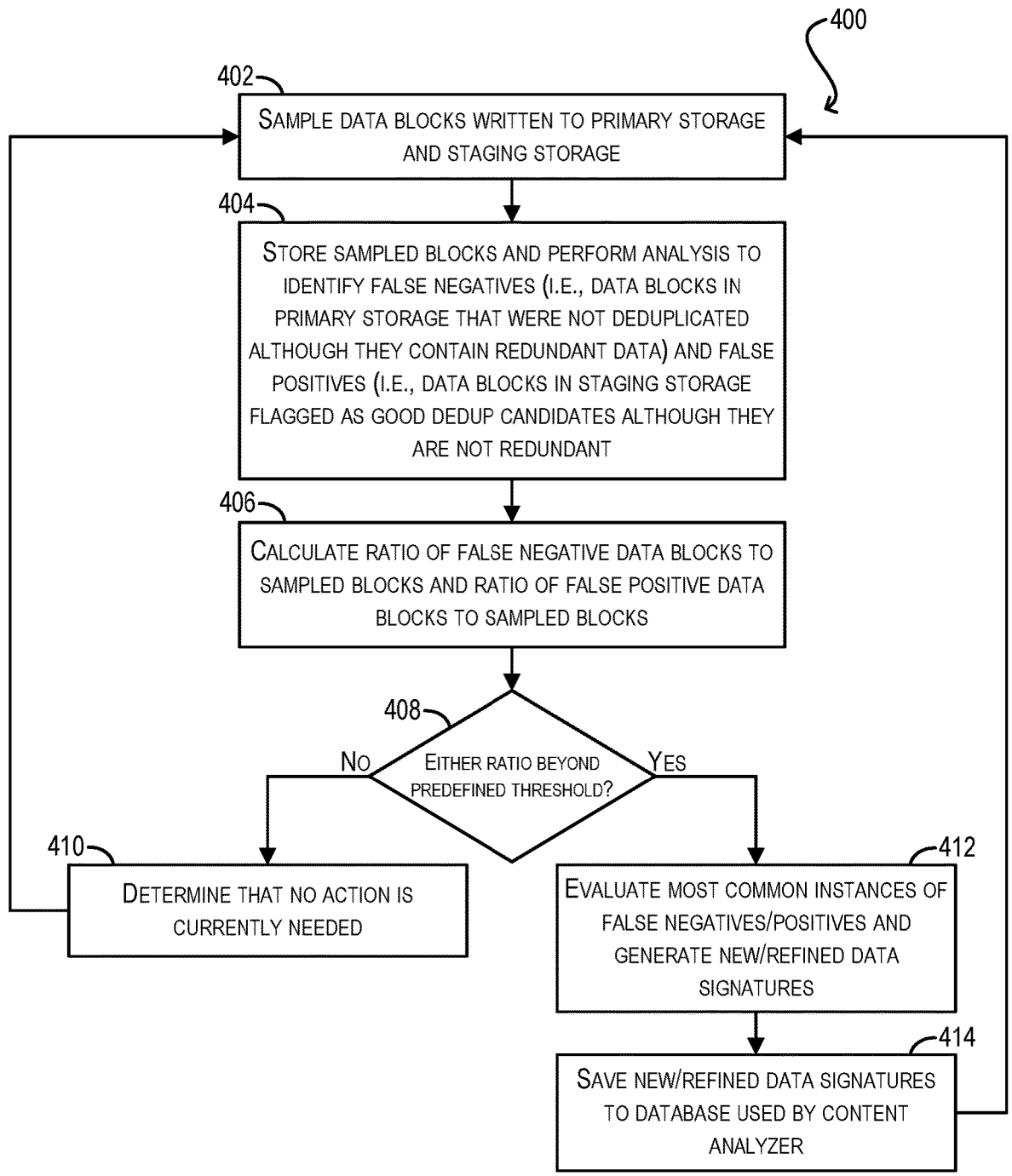
FIG. 4 depicts a flowchart performed by a tuning engine for dynamically tuning the operation of the content analyzer according to an embodiment.

FIG. 4 depicts a workflow 400 that can be executed by the tuning engine described above for improving the operation of content analyzer 202 according to an embodiment. Since the tuning engine separate and independent of content analyzer 202, workflow 400 can be performed concurrently with content analysis workflow 300 of FIG. 3.

Starting with step 402, the tuning engine can sample data blocks from primary storage component 204 and staging storage component 206. In one set of embodiments, the tuning engine can be limited to sampling data blocks already being fetched as a result of a read request issued by a storage client 106. This can reduce the impact of the tuning engine's processing on the existing workloads of the system. Alternatively, the tuning engine can perform this sampling on a periodic basis in a manner that is independent of the I/O requests issued by storage clients 106.

At step 404, the tuning engine can store the sampled data blocks in a local data structure and can analyze this data structure to (1) identify data blocks read from primary storage component 204 that were not deduplicated by deduplication post-processor 110 even though they contain redundant data (i.e., false negatives), and (2) identify data blocks read from staging storage component 206 that were flagged as good deduplication candidates by content analyzer 202 even though they are not redundant (i.e., false positives). The tuning engine can further calculate a ratio of false negative data blocks to sampled data blocks and a ratio of false positive data blocks to sampled data blocks (step 406). Taken together, these two ratios can indicate the accuracy of the content analyzer 202 in identifying good and bad deduplication candidates (with lower ratio values indicating higher accuracy and higher ratio values indicating lower accuracy).

Upon calculating the false negative and false positive ratios, the tuning engine can check whether either ratio exceeds a respective predefined threshold (step 408). If not, the tuning engine can determine that no action is needed at this time (step 410) and, after some time interval, can return to step 402 in order to sample and process further data blocks from primary storage component 204 and staging storage component 206.

However, if the tuning engine determines that the ratio of false negative data blocks to sampled data blocks or the ratio of false positive data blocks to sampled data blocks exceeds its respective threshold at step 408, the tuning engine can evaluate the most common instances of false negatives or false positives and generate new/refined data signatures based on that analysis (step 412).

Finally, at step 414, the tuning engine can then write the new/refined data signatures to the signature database used by content analyzer 202 and can return to step 402 after some time interval as mentioned above in order to repeat the process.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing content-based post-process data deduplication, the method comprising:
   receiving, by a computer system, a write request comprising write data to be persisted to a storage system;
   sampling, by the computer system, a portion of the write data;
   executing, by the computer system, one or more analyses on the sampled portion in order to determine whether the write data is a good deduplication candidate that should be processed via data deduplication, the one or more analyses including a signature-based analysis that involves comparing the sampled portion with a plurality of data signatures stored in a signature database, each data signature in the plurality of data signatures comprising a sequence of bytes at certain data block offsets that is found in one or more types of storage objects that are good deduplication candidates;
   in response to determining that the one or more analyses indicate the write data is a good deduplication candidate, causing, by the computer system, the write data to be persisted to a staging storage component of the storage system;
   in response to determining that the one or more analyses indicate the write data is not a good deduplication candidate, causing, by the computer system, the write data to be persisted to a primary storage component of the storage system;
   sampling, by the computer system, data blocks from the primary storage component and the secondary storage component that are fetched in response to read requests initiated by storage clients;
   determining, by the computer system based on the sampled data blocks, an accuracy of the computer system in identifying good deduplication candidates; and
   if the determined accuracy is below a predefined threshold:
      generating one or more new or refined data signatures via an analysis of the sampled data blocks; and
      saving the new or refined data signatures to the signature database.

2. The method of claim 1 wherein the one or more analyses further include a proximity-based analysis that evaluates whether the sampled portion comprises one or more data blocks that are close, in terms of logical storage address, to one or more other data blocks previously determined by the computer system to be part of a good deduplication candidate.

3. The method of claim 1 wherein the one or more analyses further include an entropy-based analysis that calculates an entropy level of the sampled portion and determines whether the write data is a good deduplication candidate based on the calculated entropy level.

4. The method of claim 1 wherein the one or more analyses further include:
   determining whether the write request overlaps a previous write request; and
   determining whether the sampled portion spans one or more data blocks that are part of a lazy initialized storage area of the storage system.

5. The method of claim 1 wherein upon being persisted to the staging storage component, the write data is deduplicated into deduplicated write data and the deduplicated write data is transferred from the staging storage component to the primary storage component.

6. A non-transitory computer readable storage medium having stored thereon program code executable by a computer system, the program code embodying a method for implementing content-based post-process data deduplication, the method comprising:
   receiving a write request comprising write data to be persisted to a storage system;
   sampling a portion of the write data;
   executing one or more analyses on the sampled portion in order to determine whether the write data is a good deduplication candidate that is likely to contain redundancies which can be eliminated via data deduplication, the one or more analyses including a signature-based analysis that involves comparing the sampled portion with a plurality of data signatures stored in a signature database, each data signature in the plurality of data signatures comprising a sequence of bytes at certain data block offsets that is found in one or more types of storage objects that are good deduplication candidates;
   in response to determining that the one or more analyses indicate the write data is a good deduplication candidate, causing the write data to be persisted to a staging storage component of the storage system;
   in response to determining that the one or more analyses indicate the write data is not a good deduplication candidate, causing the write data to be persisted to a primary storage component of the storage system;
   sampling data blocks from the primary storage component and the secondary storage component that are fetched in response to read requests initiated by storage clients;
   determining, based on the sampled data blocks, an accuracy of the computer system in identifying good deduplication candidates; and
   if the determined accuracy is below a predefined threshold:
      generating one or more new or refined data signatures via an analysis of the sampled data blocks; and
      saving the new or refined data signatures to the signature database.

7. The non-transitory computer readable storage medium of claim 6 wherein the one or more analyses further include a proximity-based analysis that evaluates whether the sampled portion comprises one or more data blocks that are close, in terms of logical storage address, to one or more other data blocks previously determined by the computer system to be part of a good deduplication candidate.

8. The non-transitory computer readable storage medium of claim 6 wherein the one or more analyses further include an entropy-based analysis that calculates an entropy level of the sampled portion and determines whether the write data is a good deduplication candidate based on the calculated entropy level.

9. The non-transitory computer readable storage medium of claim 6 wherein the one or more analyses further include:
    determining whether the write request overlaps a previous write request; and
    determining whether the sampled portion spans one or more data blocks that are part of a lazy initialized storage area of the storage system.

10. The non-transitory computer readable storage medium of claim 6 wherein upon being persisted to the staging storage component, the write data is deduplicated into deduplicated write data and the deduplicated write data is transferred from the staging storage component to the primary storage component.

11. A computer system comprising:
    a processor; and
    a non-transitory computer readable medium having stored thereon program code that, when executed, causes the processor to:
        receive a write request comprising write data to be persisted to a storage system;
        sample a portion of the write data;
        execute one or more analyses on the sampled portion in order to determine whether the write data is a good deduplication candidate that is likely to contain redundancies which can be eliminated via data deduplication, the one or more analyses including a signature-based analysis that involves comparing the sampled portion with a plurality of data signatures stored in a signature database, each data signature in the plurality of data signatures comprising a sequence of bytes at certain data block offsets that is found in one or more types of storage objects that are good deduplication candidates;
        in response to determining that the one or more analyses indicate the write data is a good deduplication candidate, cause the write data to be persisted to a staging storage component of the storage system;
        in response to determining that the one or more analyses indicate the write data is not a good deduplication candidate, cause the write data to be persisted to a primary storage component of the storage system;
        sample data blocks from the primary storage component and the secondary storage component that are fetched in response to read requests initiated by storage clients;
        determine, based on the sampled data blocks, an accuracy of the computer system in identifying good deduplication candidates; and
        if the determined accuracy is below a predefined threshold:
            generate one or more new or refined data signatures via an analysis of the sampled data blocks; and
            save the new or refined data signatures to the signature database.

12. The computer system of claim 11 wherein the one or more analyses further include a proximity-based analysis that evaluates whether the sampled portion comprises one or more data blocks that are close, in terms of logical storage address, to one or more other data blocks previously determined by the computer system to be part of a good deduplication candidate.

13. The computer system of claim 11 wherein the one or more analyses further include an entropy-based analysis that calculates an entropy level of the sampled portion and determines whether the write data is a good deduplication candidate based on the calculated entropy level.

14. The computer system of claim 11 wherein the one or more analyses further include:
    determining whether the write request overlaps a previous write request; and
    determining whether the sampled portion spans one or more data blocks that are part of a lazy initialized storage area of the storage system.

15. The computer system of claim 11 wherein upon being persisted to the staging storage component, the write data is deduplicated into deduplicated write data and the deduplicated write data is transferred from the staging storage component to the primary storage component.

* * * * *